US010092942B2

(12) United States Patent
Greding

(10) Patent No.: US 10,092,942 B2
(45) Date of Patent: Oct. 9, 2018

(54) PRESS TOOL FOR JOINING WORKPIECES BY MEANS OF FORMING

(71) Applicant: Rothenberger AG, Kelkheim (DE)

(72) Inventor: Arnd Greding, Hofheim (DE)

(73) Assignee: ROTHENBERGER AG, Kelkheim (DE)

( * ) Notice: Subject to any disclaimer, the term of this patent is extended or adjusted under 35 U.S.C. 154(b) by 0 days.

(21) Appl. No.: 14/900,634

(22) PCT Filed: Jun. 17, 2014

(86) PCT No.: PCT/DE2014/100200
§ 371 (c)(1),
(2) Date: Dec. 22, 2015

(87) PCT Pub. No.: WO2015/000465
PCT Pub. Date: Jan. 8, 2015

(65) Prior Publication Data
US 2017/0014894 A1    Jan. 19, 2017

(30) Foreign Application Priority Data
Jul. 1, 2013  (DE) .................. 10 2013 106 870

(51) Int. Cl.
*B21D 39/04* (2006.01)
*B25B 27/00* (2006.01)
*F16L 23/06* (2006.01)
*B25B 27/10* (2006.01)

(52) U.S. Cl.
CPC ........ *B21D 39/048* (2013.01); *B25B 27/0035* (2013.01); *B25B 27/10* (2013.01); *F16L 23/06* (2013.01)

(58) Field of Classification Search
CPC ... B21D 39/048; B25B 27/10; B25B 27/0035; F16L 23/06
USPC ....................................... 29/243.519
See application file for complete search history.

(56) References Cited

U.S. PATENT DOCUMENTS

| 2,706,648 A | * | 4/1955 | Gosse | ..................... F16L 23/06 24/271 |
| 2,775,806 A | * | 1/1957 | Love | ..................... F16L 23/06 24/271 |
| 4,520,542 A | * | 6/1985 | Villanyi | .............. B25B 27/0035 269/285 |
| 2003/0088962 A1 | | 5/2003 | Goop | |
| 2005/0241359 A1 | | 11/2005 | Viegener | |
| 2013/0025101 A1 | | 1/2013 | Pfeffer | |

FOREIGN PATENT DOCUMENTS

| DE | 1256011 B | 12/1967 |
| DE | 202004007033 U1 | 9/2005 |
| DE | 202004007034 U1 | 9/2005 |
| DE | 202009009456 U1 | 11/2010 |
| EP | 1095739 B1 | 5/2001 |

* cited by examiner

*Primary Examiner* — David B Jones

(57) ABSTRACT

A press tool for joining workpieces by forming, has at least two pressing jaws that can be moved relative to one another, with which pressing jaws the workpieces to be joined can be encompassed, at least partially, and which form a matrix for at least one of the workpieces to be joined, and has a closing point formed by mutually dedicated end faces of two of the pressing jaws. In an area adjacent to at least one of the end faces of the closing point, the surface of the associated pressing jaw may be retracted by an offset.

18 Claims, 3 Drawing Sheets

PRESS TOOL FOR JOINING WORKPIECES BY MEANS OF FORMING

CROSS-REFERENCE TO RELATED APPLICATIONS

This application is a U.S. national stage application under 35 U.S.C. § 371 of International Application No. PCT/DE2014/100200, filed on Jun. 17, 2014, and claims benefit to German Patent Application No. DE 10 2013 106 870.7, filed on Jul. 1, 2013. The International Application was published in German on Jan. 8, 2015, as WO 2015/000465 A1 under PCT Article 21(2).

FIELD

The invention relates to a press tool for joining workpieces by means of forming, having at least two pressing jaws which are movable relative to one another, by means of which the workpieces to be joined can be encompassed, at least in part, and which form a mold for at least one of the workpieces to be joined.

BACKGROUND

Press tools of this kind are, inter alia, known as press chains, press loops or press rings and are used, for example, to join tube pieces. For this purpose, a deformable sleeve, referred to as a press fitting system, can be used as a connector. In this case, the joint is usually produced by the tube pieces being inserted into the press fitting system by one end in each case and the press tool subsequently pressing on the press fitting system once in the region of overlap with one tube end and once in the region of overlap with the other tube end.

By means of the press tool, a forming force is exerted on the press fitting system which undergoes a change in shape as a result, and therefore a press connection between the press fitting system and the tube end received therein is produced. Conventionally, the press tool encompasses the press fitting system by its pressing jaws and exerts the forming force on the outer circumference of the press fitting system.

The pressing jaws normally form a mold for the workpiece to be deformed, since they directly press on the workpiece to be deformed. By means of the design as a mold, a targeted three-dimensional change in the shape of the workpiece to be deformed is intended to be effected on the target contour predefined by the mold.

However, the actual change in shape usually often deviates therefrom, since it additionally leads to one or more unintentional three-dimensional changes in shape. These deformations are advantageous at those points on the workpiece to be deformed that are not acted on by the pressing jaws. The material can flow herein during the pressing process and may stack up to form an undesired shape. An outwardly protruding, relatively pointed projection may be produced in this way, which projection considerably limits the functionality of the surface.

For example, using the surface as a contact surface for a sealing element is only possible to a very limited extent or not at all, since the sealing effect is reduced by such a projection and in addition the service life of the sealing element is impaired.

SUMMARY

An aspect of the invention provides a press tool for joining workpieces by forming, the press tool comprising: a first pressing jaw and a second pressing jaw, which are movable relative to one another, with which jaws the workpieces to be joined can be encompassed, at least in part; and a closing point, wherein the first and second pressing jaws form a mold for at least one of the workpieces to be joined, wherein the closing point is formed by end faces of two of the pressing jaws which are assigned to one another, wherein an associated pressing jaw includes a recessed surface, recessed by an offset in a region which adjoins at least one of the end faces of the closing point.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
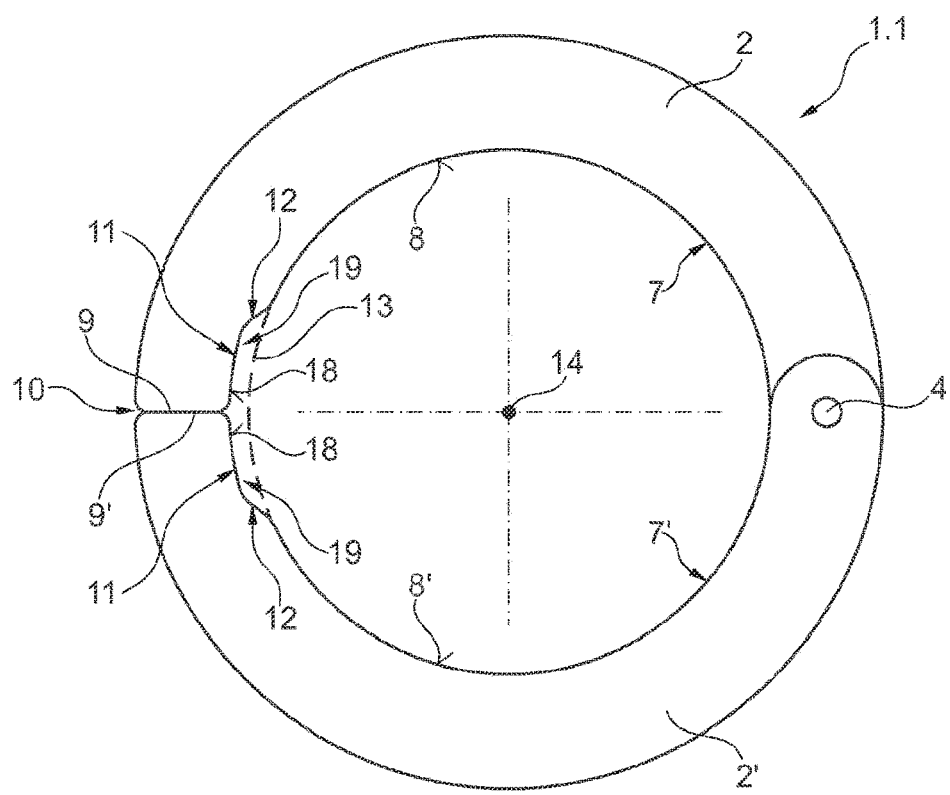
FIG. 1 is a side view of a possible embodiment of a press tool for joining workpieces by means of forming.

An aspect of the invention is therefore to provide a press tool having the features mentioned at the outset, by means of which the desired change in shape is achieved, in an improved manner to previously, when joining the workpieces in a forming manner.

A press tool according to the invention for joining workpieces by means of forming, for example cold forming, has at least two pressing jaws which are movable relative to one another, in particular which are connected such that they are movable relative to one another, by means of which the workpieces to be joined can be encompassed, at least in part, and which form a mold for at least one of the workpieces to be joined. The press tool furthermore has a closing point which is formed by end faces of two of the pressing jaws which are assigned to one another.

It is provided that the surface of the associated pressing jaw is recessed by an offset in a region which adjoins at least one of the end faces of the closing point.

By means of this feature, a region is specifically provided into which material can flow when the workpiece is being formed in order to monitor the flowing motion of the material to the extent that an unintentional three-dimensional change in the shape of the workpiece is prevented. The target contour of the press tool is therefore deliberately changed by recessing the surface, in order to counteract undesired deformation of the workpiece. Although it is accepted that the formed workpiece may not have the desired ideal contour, undesired material projections on the surface of the workpiece do not form.

In the context of the invention, the target contour of the press tool is understood to mean the space enclosed by the pressing jaws when the press tool is closed. Portions which are produced from any radii at transitions between the relevant end face and the pressing face of the pressing jaws are not included in the target contour. Such radii can be provided and are used to prevent scratches and abrasions on the workpiece when pressing the pressing jaws together.

In contrast, the ideal contour of the processed or formed workpiece is understood to mean the theoretically optimum shape of the workpiece after the pressing operation.

By the surface of the pressing jaw being recessed, the workpiece is substantially unsupported in this region or is supported only slightly by the press tool. The desired inflow of material during the forming process is facilitated as a result. By positioning the region to be adjacent to the closing point, a point is selected towards which the flowing motion specifically guides the material during the forming process.

The offset, which causes the recessed surface, forms a transition which can be produced in a stepped manner, for example in the manner of a shoulder on the surface, and/or in a continuously extending manner, for example by a slope or a curved profile. It is conceivable to provide at least one rounded portion so as to avoid sharp-edged corners and borders on the offset.

In particular, the offset forms a profile of the surface, which profile differs from the profile of the recessed surface which adjoins the offset.

In particular, the transition formed by the offset is arranged on the recessed surface at a spacing from the closing point such that the recessed surface substantially extends as far as the closing point.

In particular, by means of the recessed surface, a receiving portion for deformation material of at least one of the workpieces is formed, the receiving portion being retained when the press tool is closed. It is thereby ensured that the flowing motion of the deformation material or material is monitored throughout the entire pressing process by the deformation material of the workpieces being able to flow into the receiving portion throughout the entire pressing process and, even at the end of the pressing process, for example when the pressing jaws rest against one another with their end faces, by said material being received in the receiving portion to a sufficient degree.

It is provided according to one embodiment of the invention that the surface of the pressing jaw is shifted, at least in part, in the region in a substantially parallel manner and/or is shifted, at least in part, to have substantially the same spacing from the target contour of the press tool. A planar bulge is produced in this way on the formed workpiece by means of the press tool, the surface of which bulge is substantially the same shape as the surface of the formed workpiece and/or the ideal contour of the formed workpiece. The functionality of the surface of the formed workpiece is substantially unchanged thereby or at least only slightly changed compared with the state before forming. The surface of the pressing jaw can therefore be recessed by the offset in the region in such a way that the recessed surface has a substantially constant spacing from the target contour of the press tool.

For example, the surface of the press tool or the pressing jaw can be shifted back in the region, in particular over a predefined length in the circumferential direction and/or a predefined angular range, at a substantially uniform spacing from the profile of the surface without the offset.

As an alternative, the surface of the press tool or the pressing jaw can be shifted back in the region at a non-uniform spacing from the profile of the surface without the offset.

For example, the surface of the pressing jaw can extend, at least in part, in the region in a substantially right-angled manner to the end face of the pressing jaw and/or tangentially to the central axis of the press tool. Such an embodiment of the recessed surface can be produced in a technically simple manner. In particular, the surface is formed for this purpose in the region in a substantially straight or planar manner, at least in part.

The embodiments according to claim 5 and claim 6 each relate to dimensioning the recessed region of the surface of one pressing jaw to a sufficient degree for the range of workpieces to be processed in order to receive some of the flowing material during the forming process to the extent that no undesired unintentional three-dimensional change in shape occurs and in particular only a planar bulge is produced.

It is ensured by the embodiment according to claim 7 that the workpiece to be formed undergoes the desired specific change in shape over the width of the pressing jaws gripping said workpiece and undesired unintentional three-dimensional changes in shape are prevented.

The embodiment of the invention according to claim 8 relates in turn to producing a planar bulge on the formed workpiece, the surface of which bulge is substantially the same shape as the surface of the workpiece. The functionality of the surface of the formed workpiece is substantially unchanged thereby or at least only slightly changed compared with the state before forming.

By means of the embodiment according to claim 9, round or circular tube elements can be joined to one another and therefore there is a greater range of applications for the press tool, in particular the sanitary sector, which covers the heating sector and the air conditioning sector.

The embodiments according to claim 10 and claim 11 each relate to actually bringing the workpiece into the desired shape by means of the forming process and therefore correctly joining the workpieces to one another.

As an alternative to the embodiment according to claim 11, it can also be provided that, after forming, the end faces of the closing point are at a spacing from one another. Forming the workpiece is thereby achieved with a reduced maximum forming force.

By means of the embodiment according to claim 12, it is possible, in a technically simple manner, to exert a forming force on the pressing jaws since, due to the articulated connection, the pressing jaws can be moved in the manner of a loop around the workpieces to be joined and, for carrying out the forming process, only the free ends of the pressing jaws arranged at the end of the chain are to be pressed towards one another.

By means of the embodiment according to claim 13, the workpieces to be joined can be brought into a processing region on the press tool in a technically simple manner in terms of handling, in which region the pressing jaws act so as to form at least one of the workpieces.

The embodiment according to claim 14 uses three or more than three braking jaws which are movable relative to one another. The braking jaws are connected to one another in a chain-like manner, the closing point being formed by the pressing jaws which form the end chain links.

The press tool can be a press chain, press loop or a press ring. In particular, the press tool can be handheld and/or can be actuated by hand. At least the pressing jaws of the press tool consist of metal or a metal alloy.

Further aims, advantages, features and possible uses of the present invention are found in the following description of two embodiments with reference to the drawings. In this case, all the described features and/or those illustrated in the drawings individually or in any reasonable combination form the subject matter of the present invention, also independently of their summary in the claims or their dependency reference.

FIG. 1 schematically shows a possible embodiment of a press tool 1.1 for joining workpieces by means of forming, in particular by means of cold forming. The press tool 1.1 can be a component of a movable press machine, which can be handheld and/or can be actuated by hand, electrically actuated or electrohydraulically actuated.

The press tool 1.1 has two pressing jaws 2 and 2' which can be mounted so as to pivot about a pivot shaft 4 with respect to one another and can receive therebetween workpieces to be joined (not shown in FIG. 1). The pressing jaws 2, 2' each have, on their inner sides 7, 7', which face each other, an active surface 8, 8' which forms a mold for the workpieces to be joined (not shown in FIG. 1).

The respective inner sides 7, 7' are preferably formed as curved portions, the inner sides 7, 7' preferably forming a ring, in particular a closed ring, when the press tool 1.1 is closed, which ring has a substantially round cross-sectional shape, in particular a circular cross-sectional shape.

The pressing jaws 2 and 2' each have an end face 9 or 9' at their free end, which is at a distance from the pivot shaft 4, the end faces 9, 9' facing one another. FIG. 1 shows the press tool 1.1 with the pressing jaws 2, 2' in the closed state, in which the end faces 9 and 9' rest against one another. The end faces 9 and 9' form a closing point 10 of the press tool 1.1.

The end faces 9 and 9' are preferably movable away from one another at a spacing by means of the pressing jaws 2, 2' pivoting away from one another, to the extent that the workpieces to be joined (not shown in FIG. 1) can be brought between the end faces 9, 9' into the inner region of the press tool 1.1, in which region the active surfaces 8, 8' are then pressed against the outer circumferential surface of the outer workpiece (not shown in FIG. 1) towards one another during a closing movement of the pressing jaws 2, 2'.

It is provided that at least one of the two pressing jaws 2, 2' has a particular configuration on its inner side 7 or 7' in a region 11 which adjoins the end face 9 or 9'. In the press tool 1.1 according to FIG. 1, the two pressing jaws 2 and 2' have this configuration, and are preferably formed substantially identically to one another. To illustrate the particular configuration of the pressing jaws 2 or 2' in the region 11, the pressing jaw 2 is shown in an enlarged detail in FIG. 2.

As can be seen here in particular, the surface of the inner side 7 is recessed in the region 11, in particular recessed in the radial direction outwardly over a circumferential portion. The surface of the inner side 7 is preferably recessed by a shoulder or similar offset 12 with respect to the original contour (dashed line 13), in particular to the target contour of the press tool 1.1. Due to the recessed surface 18, the workpiece to be formed is substantially not supported in the region 11 during the pressing process. Any material of the workpieces to be formed that flows in the pressing process can flow into the recessed region 11. Due to the recessed surface 18, a receiving portion 19 or a receiving space for material of the workpieces is therefore provided in the region 11 in a targeted manner in order to avoid an undesired unintentional three-dimensional change in the shape of the workpieces.

The surface is recessed in the region 11 to the extent that during the pressing process, the deformed workpiece experiences only a planar bulge on the surface thereof.

The region 11 extends, relative to the central axis 14 of the press tool 1.1, in its circumference at an angle W. The angle W is preferably approximately 5° to approximately 20°, in particular 10° to 15°. The absolute length of the region 11 is preferably approximately 2 mm to approximately 12 mm, in particular 4 mm to 8 mm, in the circumferential direction.

The recessed surface 18 is preferably shifted in the region 11 in a substantially parallel manner with respect to the original contour (dashed line 13) by the offset 12, in particular the recessed surface 18 extends concentrically to or with the same curvature as the original contour 13.

The offset 12 can be approximately 1% to approximately 5%, in particular 2% to 4%, of the diameter which the inner sides 7, 7' of the pressing jaws 2, 2' form outside of the region 11 when the press tool 1.1 is closed.

Across the region 11, the surface preferably remains within this contour change with respect to the original contour. For example, the offset 12 is approximately 1 mm to 2 mm when the diameter is approximately 65 mm.

The region 11 with its recessed surface 18, seen in the direction of the central axis 14 of the press tool 1.1, preferably extends substantially over the length thereof in the direction of the central axis 14, in particular substantially continuously over the length, in particular uniformly.

Figure 2:
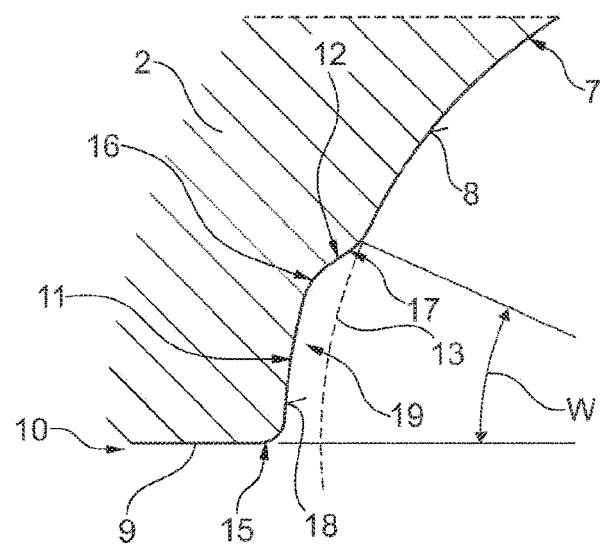
FIG. 2 is an enlarged sectional view of a detail of one of the pressing jaws of the press tool according to FIG. 1.

As can be seen inter alia from FIG. 2, the transition between the end face 9 to the adjoining region 11 is provided with a rounded portion 15, and therefore the transition is rounded in order to avoid scratches and abrasions on the surface of the workpiece to be deformed during pressing. Further rounded portions 16, 17 can be formed on the offset 12. The rounded portions 16 and 17 ensure that sharp-edged transitions on the formed workpiece are avoided by the recessed surface 18.

Figure 3A:
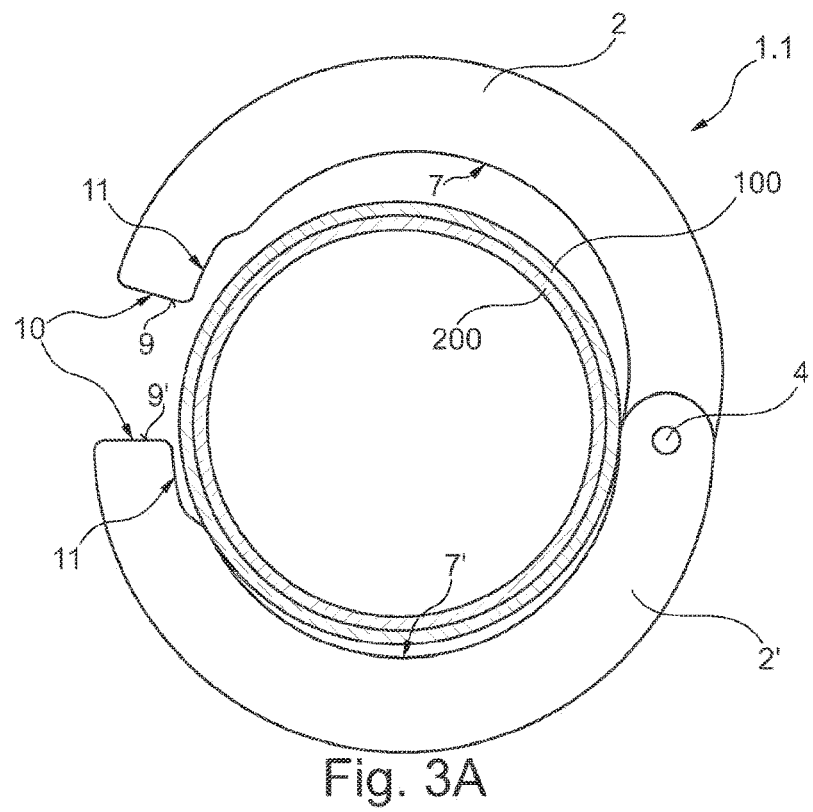
FIG. 3A shows the press tool according to FIG. 1 before the pressing process, the press tool encompassing, by its pressing jaws, two workpieces to be joined to one another.

FIG. 3A shows the press tool 1.1 of FIGS. 1 and 2 in an open state. Between the pressing jaws 2 and 2', two workpieces 100 and 200, in particular tube pieces, are received which are inserted into one another in the received region. By pressing the pressing jaws 2 and 2' together, at least the outer workpiece 100 is formed, proceeding from the state shown in FIG. 3A, and therefore by means of the forming the workpieces 100 and 200 are pressed together and therefore a rigid connection between the workpieces 100 and 200 is produced.

Figure 3B:
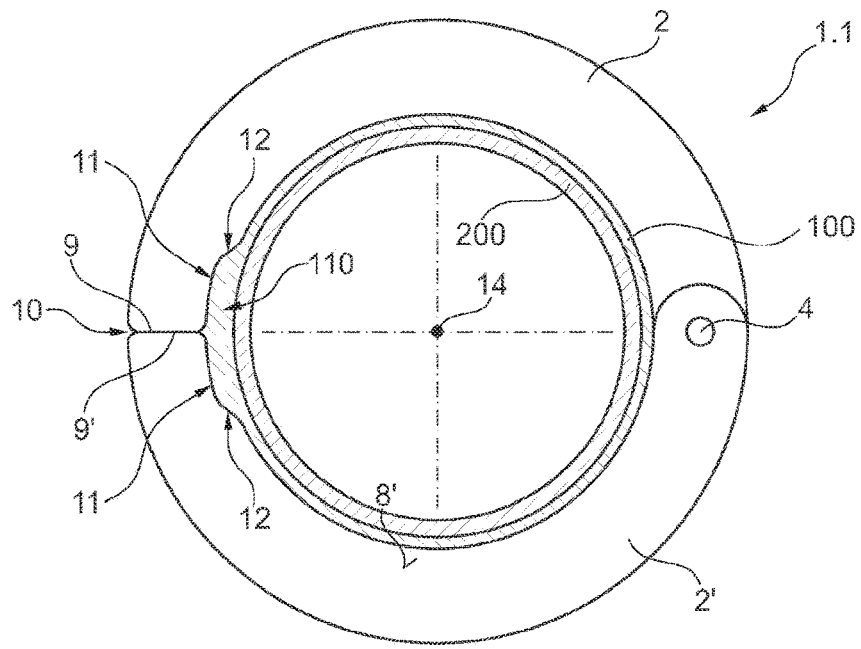
FIG. 3B shows the press tool according to FIG. 1 and the workpieces according to FIG. 3A encompassed thereby after the pressing process.

This state after forming is shown in FIG. 3B, in which the press tool 1.1 is present with pressing jaws 2 and 2' pivoted relative to one another and having end faces 9 and 9' which are brought to rest against one another. The workpiece 100 has been correspondingly deformed by the recessed surfaces 18 of the pressing jaws 2 and 2' in the region 11 and the target contour provided thereby, and therefore the workpiece 100 has a bulge 110, a bump or similar protuberance protruding outwards at this point.

Depending on the application, the inner workpiece may also have a bulge, a bump or similar protuberance. In the application according to FIGS. 3A and 3B, the inner workpiece 200 remains substantially without deformation throughout the pressing process.

Figure 4:
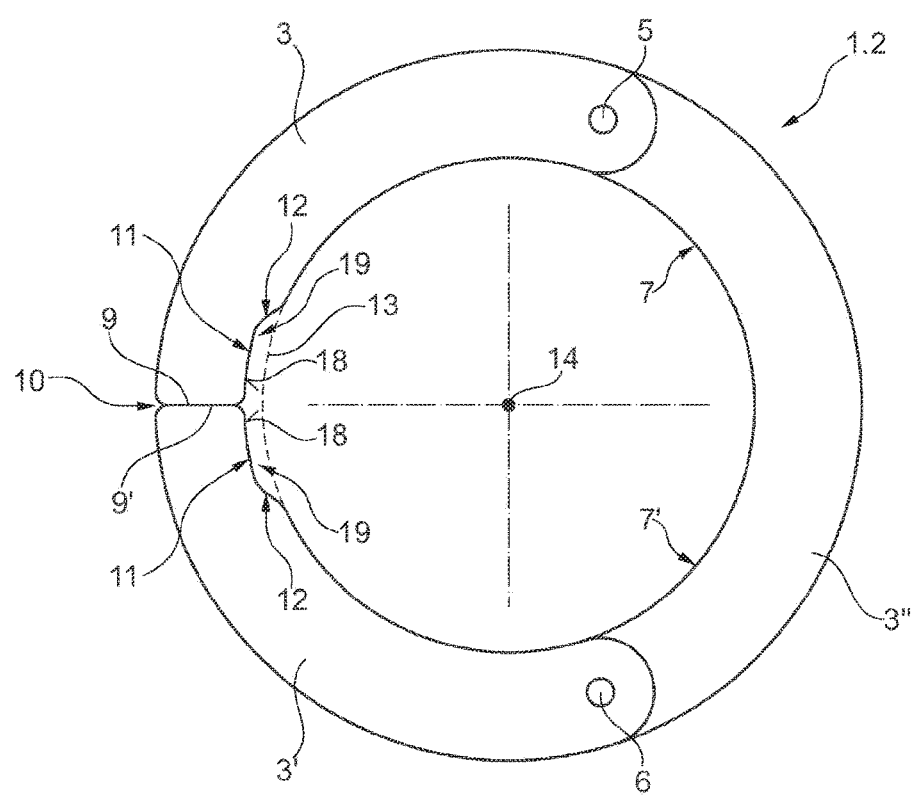
FIG. 4 is a side view of another possible embodiment of a press tool.

FIG. 4 schematically shows another embodiment of a press tool 1.2. Components of the press tool 1.2 according to FIG. 4 which are identical or identical in terms of function to the components of the press tool 1.1 according to FIGS.

1 to 3 are provided with the same reference numerals; reference is made in this respect to the description of the press tool 1.1 according to FIGS. 1 to 3.

The press tool 1.2 according to FIG. 4 differs from the press tool 1.1 according to FIGS. 1 to 3 inter alia in that the press tool 1.2 has three pressing jaws 3, 3' and 3" which are mounted so as to be movable relative to one another. The pressing jaws 3, 3', 3" are connected to one another in a chain-like manner, the pressing jaws 3 and 3' which form the closing point 10 forming the end chain links.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE NUMERALS 1.1 press tool
1.2 press tool
2 pressing jaw
2' pressing jaw
3 pressing jaw
3' pressing jaw
3" pressing jaw
4 pivot shaft
5 pivot shaft
6 pivot shaft
7 inner side
7' inner side
8 active surface
8' active surface
9 end face
9' end face
10 closing point
11 region
12 offset
13 dashed line (original contour)
14 central axis
15 rounded portion
16 rounded portion
17 rounded portion
18 recessed surface
19 receiving portion
100 workpiece
110 bulge
200 workpiece
W angle

The invention claimed is:

1. A press tool for joining workpieces by forming, the press tool comprising:
a first pressing jaw and a second pressing jaw, which are movable relative to one another, with which jaws the workpieces to be joined can be encompassed, at least in part; and
a closing point,
wherein the first and second pressing jaws form a mold for at least one of the workpieces to be joined,
wherein the closing point is formed by end faces of two of the pressing jaws which are assigned to one another,
wherein a target contour is formed by a space enclosed by the pressing jaws when the press tool is closed,
wherein, in a region which adjoins at least one of the end faces of the closing point, an associated pressing jaw includes a recessed surface, recessed from the target contour by an offset, and
wherein the recessed surface has a constant spacing from the target contour.

2. The tool claim 1, further comprising:
a receiving portion for deformation material of at least one of the workpieces, formed due to the recessed surface,
wherein the receiving portion is retained when the press tool is closed.

3. The tool of claim 1, wherein the recessed surface of the associated pressing jaw is recessed, at least in part, in the region in a substantially parallel manner to the target contour.

4. The tool of claim 1, wherein the recessed surface of the associated pressing jaw extends, at least in part, in the region in at least one of a substantially right-angled manner to the end face of the pressing jaw or tangentially to the central axis of the press tool.

5. The tool of claim 4, wherein the recessed surface of the associated pressing jaw extends, at least in part, in the region in a substantially right-angled manner to the end face of the associated pressing jaw.

6. The tool of claim 4, wherein the recessed surface of the associated pressing jaw extends, at least in part, tangentially to the central axis of the press tool.

7. The tool of claim 1, wherein the region has an absolute length in a circumferential direction of 2 mm to 12 mm.

8. The tool of claim 7, wherein the absolute length is 4 mm to 8 mm.

9. The tool of claim 1, wherein the region covers an angle of 5° to 20°, relative to a central axis of the press tool.

10. The tool of claim 1, wherein, when viewed in a direction of a central axis of the press tool, the region extends substantially over a length of the pressing jaw.

11. The tool of claim 1, wherein, when viewed in a direction of a central axis of the press tool, at least one of the region or the offset extends in a substantially uniform manner.

12. The tool of claim 1, wherein when the pressing jaws move towards one another, the mold formed by the pressing jaws has a substantially round cross-sectional shape.

13. The tool of claim 1, wherein when the pressing jaws are moved towards one another, the end faces of the closing point are brought into contact with one another.

14. The tool of claim 1, wherein, after forming, the end faces of the closing point rest against one another.

15. The tool of claim 1, wherein two adjacent pressing jaws are articulated to one another in each case such that the workpieces to be joined can be encompassed by the pressing jaws.

16. The tool of claim 1, wherein the end faces of the closing point can be placed at a distance from one another to the extent that an insertion opening for the workpieces to be joined is formed in order to encompass the workpieces using the pressing jaws.

17. The tool of claim 1, further comprising:

a third pressing jaw, the three pressing jaws being movable relative to one another and connected to one another in a chain-like manner, wherein the first and second pressing jaws, which form the closing point, form end chain links.

18. A press tool for joining workpieces by forming, the press tool comprising:

a first pressing jaw and a second pressing jaw, which are movable relative to one another, with which jaws the workpieces to be joined can be encompassed, at least in part;

a closing point; and a receiving portion, wherein the jaws form a mold for at least one of the workpieces to be joined, wherein the closing point is formed by end faces of two of the pressing jaws which are assigned to one another, wherein a target contour is formed by a space enclosed by the pressing jaws when the press tool is closed, wherein, in a region which adjoins at least one of the end faces of the closing point, an associated pressing jaw includes a recessed surface, recessed from the target contour by an offset, wherein the recessed surface has a constant spacing from the target contour, and wherein, due to the recessed surface, the receiving portion for deformation material of at least one of the workpieces is also formed when the press tool is closed.

* * * * *